(12) United States Patent
Eoh et al.

(10) Patent No.: US 11,347,237 B2
(45) Date of Patent: May 31, 2022

(54) METHOD OF PERFORMING CLOUD SLAM IN REAL TIME, AND ROBOT AND CLOUD SERVER FOR IMPLEMENTING THE SAME

(71) Applicant: LG ELECTRONICS INC., Seoul (KR)

(72) Inventors: Gyuho Eoh, Seoul (KR); Jungsik Kim, Seoul (KR); Hyoungrock Kim, Seoul (KR); Moonsik Nam, Seoul (KR); Sookhyun Yang, Seoul (KR); Donghak Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 189 days.

(21) Appl. No.: 16/557,000

(22) Filed: Aug. 30, 2019

(65) Prior Publication Data
US 2020/0004266 A1    Jan. 2, 2020

(30) Foreign Application Priority Data

Aug. 1, 2019   (KR) .......................... 10-2019-0093716

(51) Int. Cl.
*G05D 1/10*  (2006.01)
*G05D 1/02*  (2020.01)
*B25J 9/16*  (2006.01)

(52) U.S. Cl.
CPC .......... *G05D 1/0274* (2013.01); *B25J 9/1664* (2013.01); *B25J 9/1682* (2013.01); *B25J 9/1697* (2013.01); *G05D 1/0248* (2013.01); *G05D 1/0276* (2013.01)

(58) Field of Classification Search
CPC ...... B25J 9/1682; B25J 9/1664; B25J 9/1697; G05D 1/0274; G05D 1/0276; G05D 1/0248
USPC ................................ 700/245; 901/1; 701/23
See application file for complete search history.

(56) References Cited

U.S. PATENT DOCUMENTS

| | | | |
|---|---|---|---|
| 2014/0350839 A1* | 11/2014 | Pack | G05D 1/0214 701/409 |
| 2016/0147230 A1* | 5/2016 | Munich | G01C 21/206 701/28 |
| 2018/0253107 A1* | 9/2018 | Heinla | G06Q 10/0833 |
| 2019/0212730 A1* | 7/2019 | Jones | G05D 1/028 |

* cited by examiner

*Primary Examiner* — Dalena Tran
(74) *Attorney, Agent, or Firm* — Ked & Associates LLP

(57) ABSTRACT

Provided are a method of performing cloud simultaneous localization and mapping (SLAM), and a robot and a cloud server for performing the same, and a robot for performing cloud SLAM in real time includes a first sensor configured to acquire sensor data necessary to perform the SLAM, a map storage unit configured to store a map synchronized with a cloud server, a communication unit configured to transmit the sensor data, a feature, or a last frame to the cloud server and receive a local map patch or a global pose from the cloud server, and a control unit configured to generate the sensor data, the feature extracted from the sensor data, or the last frame and control movement of the robot using the local map patch or the global pose received from the cloud server.

18 Claims, 11 Drawing Sheets

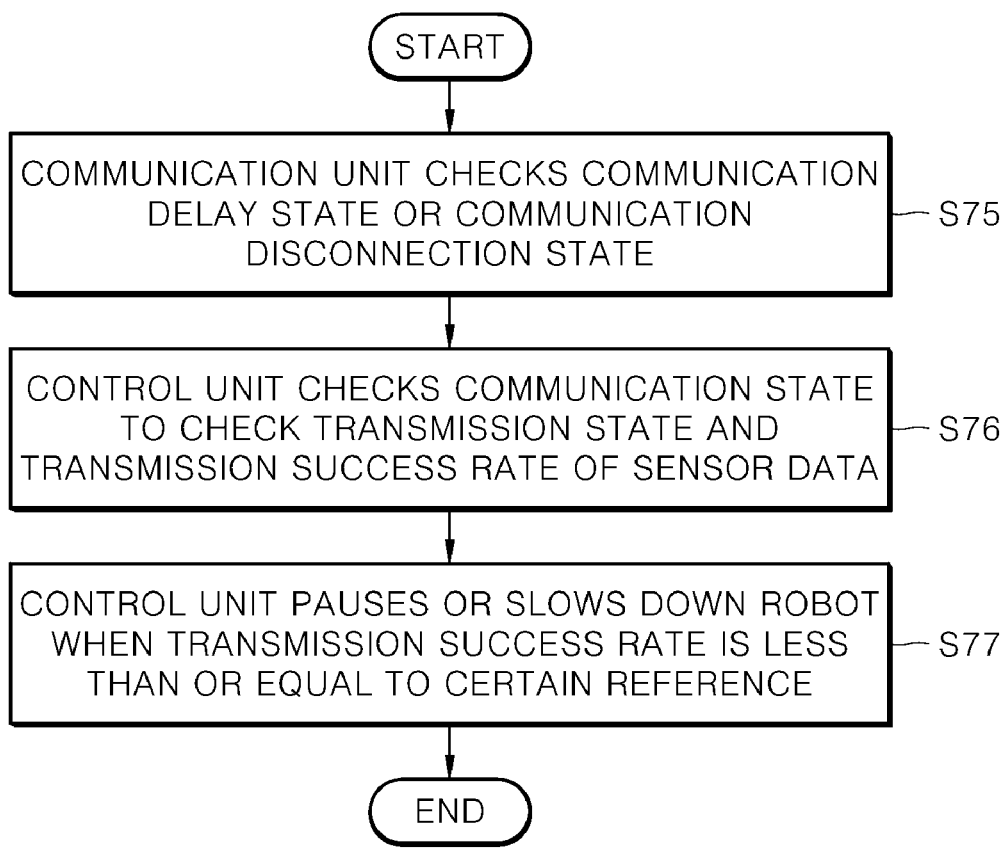

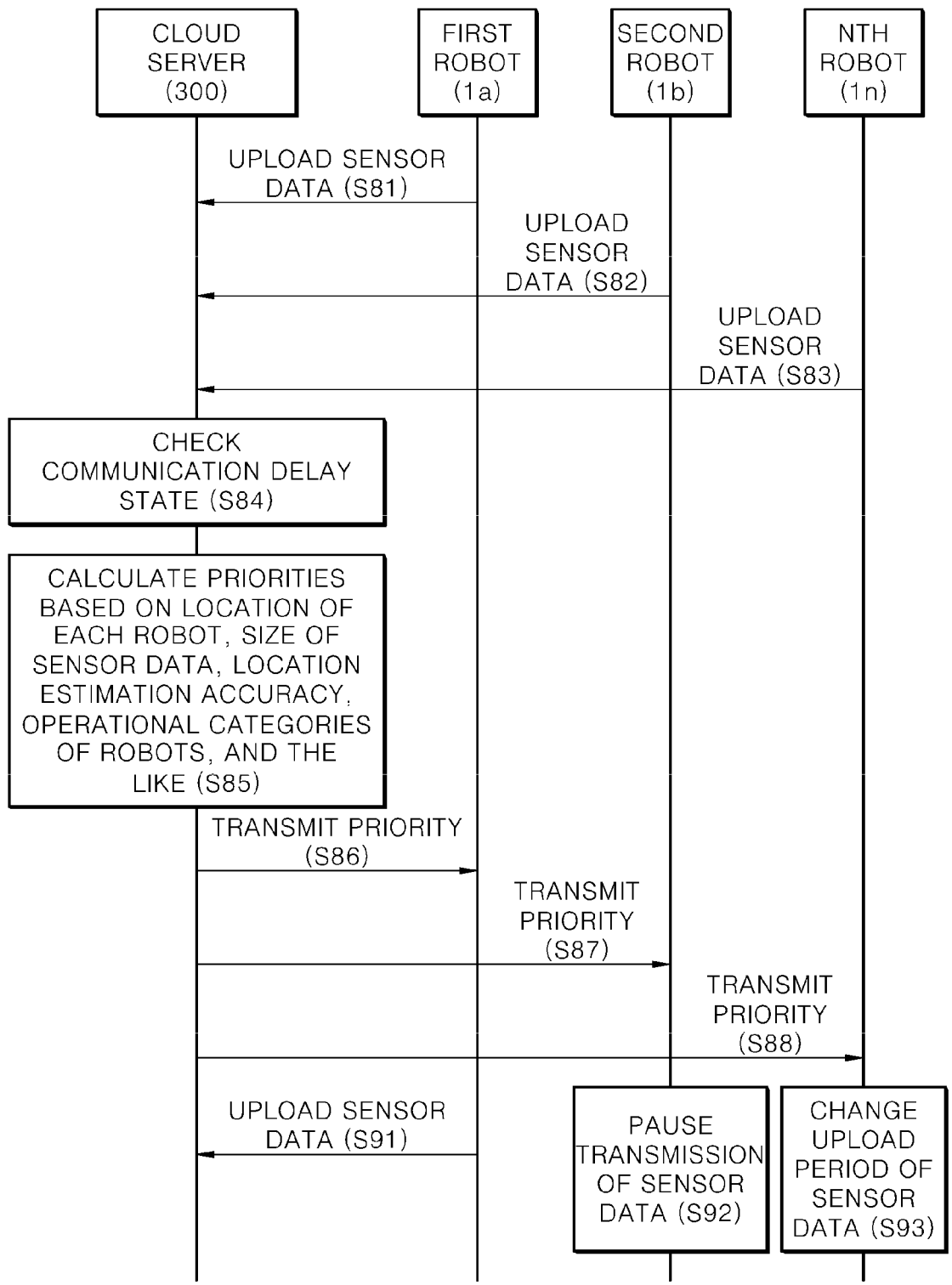

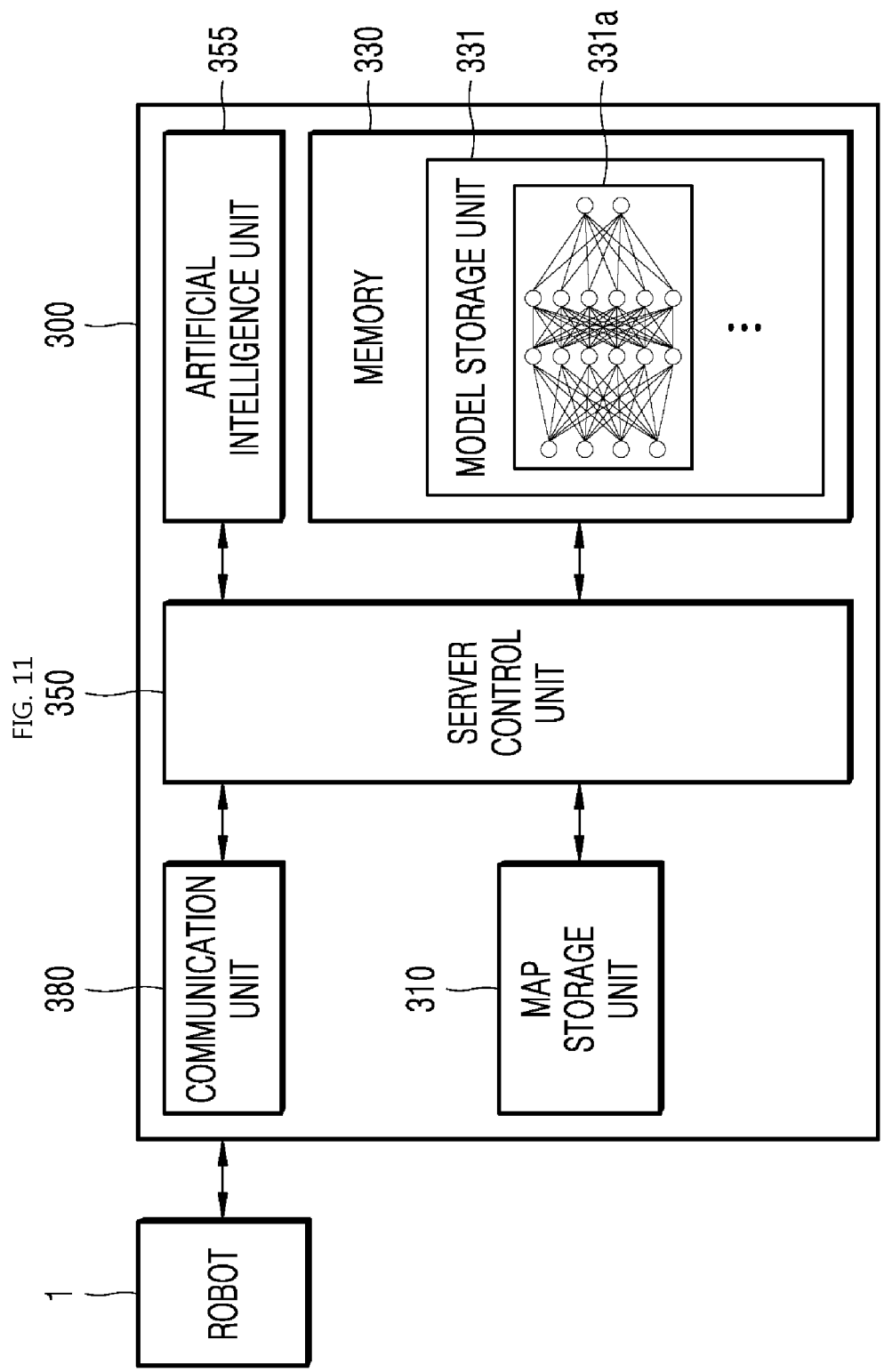

METHOD OF PERFORMING CLOUD SLAM IN REAL TIME, AND ROBOT AND CLOUD SERVER FOR IMPLEMENTING THE SAME

CROSS-REFERENCE TO RELATED APPLICATION

This application claims priority to and the benefit of Korean Patent Application No. 10-2019-0093716, filed on Aug. 1, 2019, the disclosure of which is incorporated herein by reference in its entirety.

BACKGROUND

1. Field of the Invention

The present invention relates to a method of performing cloud simultaneous localization and mapping (SLAM) in real time and a robot and a cloud server for implementing the same.

2. Discussion of Related Art

Robots may be placed to provide information or convenience to people in spaces where personal and material exchanges are actively conducted such as a large-scale mart store, a department store, an airport, and a golf course.

The robots may include a guide robot, a security robot, a cleaning robot, and the like, and these various robots move while checking their locations in the space.

In order for robots to check their locations, avoid obstacles, and move around, the robots have to keep spatial information and information regarding the current locations and routes the robots have previously traveled.

Also, in this process, the robots may ascertain their current locations by storing information about the physical layout of the surrounding space and comparing the information to map information that has been stored.

However, in order for a robot to accurately determine the current location, there is a need for the precision of information about the layout or space for the surrounding environments.

As the precision of information increases, the size of data to be processed increases, and thus the computing power of a processor necessary to process the data also requires high performance.

This specification proposes a solution for a robot to process high-precision information in operative association with a cloud server and perform simultaneous localization and mapping (SLAM).

BRIEF DESCRIPTION OF THE DRAWINGS

The above and other objects, features and advantages of the present invention will become more apparent to those of ordinary skill in the art by describing in detail exemplary embodiments thereof with reference to the accompanying drawings, in which:

FIG. 9 shows a process of performing kidnap recovery when a communication delay occurs according to an embodiment of the present invention;

FIG. 10 shows a process in which a cloud server sets priorities while performing a SLAM process along with robots according to an embodiment of the present invention; and FIG. 11 shows another configuration of a cloud server according to an embodiment of the present invention.

DETAILED DESCRIPTION OF EXEMPLARY EMBODIMENTS

Figure 1:
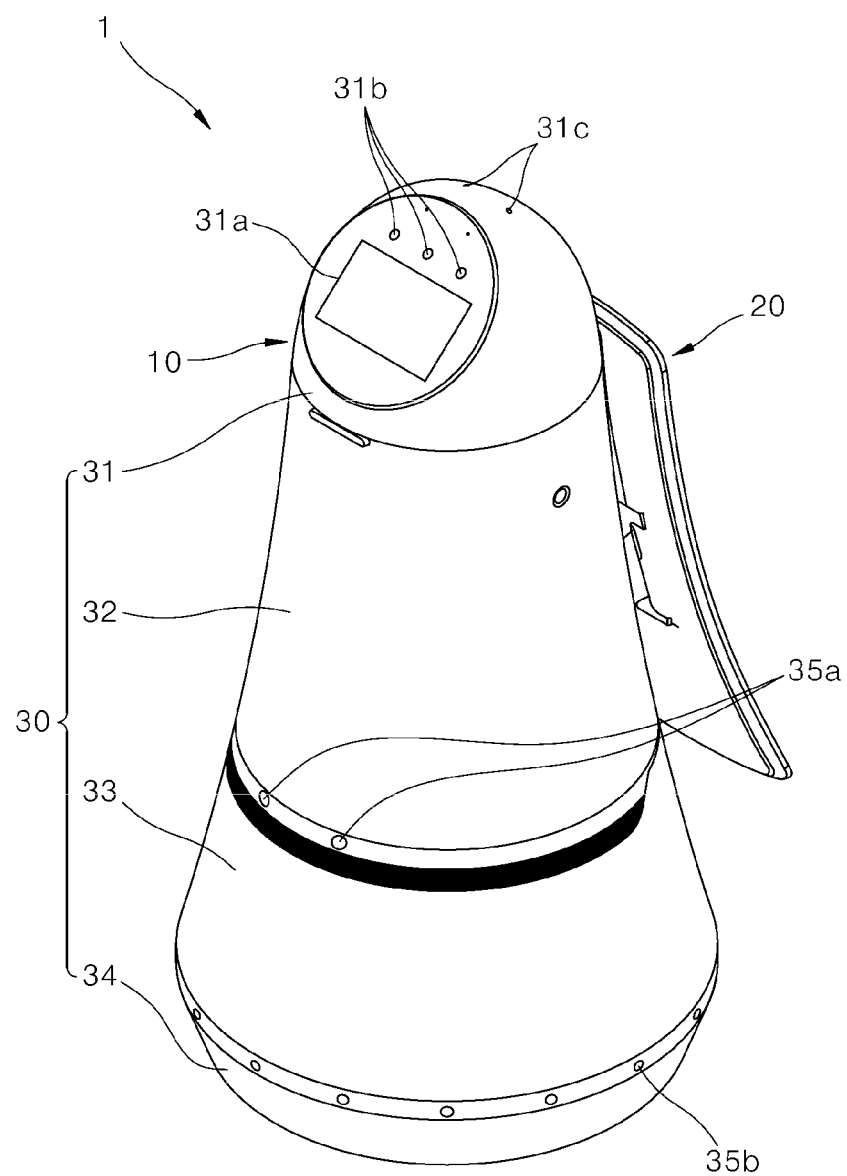
FIG. 1 is a diagram showing an external appearance of a robot according to an embodiment of the present invention.

Hereinafter, exemplary embodiments of the present invention will be described in detail with reference to the accompanying drawings so that they can be easily practiced by those skilled in the art. The present invention may be embodied in many different forms and should not be construed as being limited to the embodiments set forth herein.

Also, portions irrelevant to the description of the present invention will be omitted for clarity. Moreover, the same or similar elements are designated by the same reference numerals throughout the specification. Also, some embodiments of the present invention will be described in detail with reference to the accompanying drawings. In adding reference numerals to elements in each figure, it should be noted the same elements will be designated by the same reference numerals, if possible, although they are shown in different drawings. Further, in the following description of the present invention, a detailed description of known elements or functions will be omitted when it may make the subject matter of the present invention rather unclear.

Terms such as first, second, A, B, (a), (b) and the like may be used herein when describing elements of the present invention. These terms are intended to distinguish one element from other elements, and the essence, order, sequence, or number of corresponding elements is not limited by these terms. It should be noted that if it is described in the specification that one component is "connected," "coupled" or "joined" to another component, the former may be directly "connected," "coupled" or "joined" to the latter or "connected," "coupled" or "joined" to the latter via another component.

Further, for convenience of description, one element may be described as its sub-elements in implementing the present invention; however, the sub-elements may be implemented in a single device or module in an integrated manner or implemented in multiple devices or modules in a distributed manner.

The term "robot" used herein includes an apparatus that moves for a specific propose (cleaning, security, monitoring, guiding, etc.) or that moves while providing a function corresponding to characteristics of a space where the robot moves around. Accordingly, the term "robot" used herein collectively refers to an apparatus that has a moving means capable of moving by using sensors and predetermined information and that provides a predetermined function.

In this specification, a robot may move around with a map. A map refers to information about static objects such as walls and stairs, which are ascertained as not moving in space. Also, information about moving obstacles arranged periodically, that is, dynamic objects may also be included in the map.

In an embodiment, information about obstacles placed within a certain range with respect to a traveling direction of a robot may also be included in the map. In this case, information about obstacles may be temporarily registered in the map and then may be removed from the map after the robot passes by, unlike the aforementioned map including the static objects.

In this specification, a robot transmits or receives information through communication with a cloud server and performs simultaneous localization and mapping (SLAM) on the basis of the information. This is called cloud SLAM.

A robot may use a LiDAR sensor for locating things or a camera sensor for capturing an image to perform the SLAM. A robot may perform the SLAM using any one or both of the LiDAR sensor and the camera sensor.

FIG. 1 is a diagram showing an external appearance of a robot according to an embodiment of the present invention. The robot may have various shapes, and FIG. 1 corresponds to an exemplary external appearance. The robot of the present invention may be implemented to have various external appearances other than the external appearance of FIG. 1. In particular, elements may be placed at different locations in different directions depending on the shape of the robot.

The present invention is applied to various types of robots. As shown in FIG. 1, the present invention is applied to an upright robot as shown in FIG. 1, but is applied to various types of robots such as a cart robot utilized by users in a mart store, a cleaning robot, a security robot, and the like. That is, the present invention may be applied to any moving robot that checks a space and performs autonomous driving. The exemplary external appearance of the robot will be described below in detail.

A main body 10 may be formed to have a long length in the vertical direction and to have the overall form of a roly-poly toy that has a width decreasing in a direction from the bottom to the top.

The main body 10 may include a casing 30 forming an external appearance of a robot 1. The casing 30 may include a top cover 31 disposed in an upper side, a first middle cover 32 disposed below the top cover 31, a second middle cover 33 disposed below the first middle cover 32, and a bottom cover 34 disposed below the second middle cover 33. Here, the first middle cover 32 and the second middle cover 33 may be formed as a single middle cover.

The top cover 31 is located on an uppermost end of the robot 1 and may have the shape of a hemisphere or dome. The top cover 31 may be located at a height lower than an adult height in order to easily receive a command from a user. Also, the top cover 31 may be rotatable within a predetermined angle.

The robot 1 may further include a control module 150 therein. The control module 150 controls the robot 1 as if it is a kind of computer or processor. Accordingly, the control module 150 may be disposed in the robot 1 to perform a similar function to a main processor and may be in charge of interacting with a user. Also, the control module 150 is in charge of communicating with a cloud server.

The control module 150 is installed in the robot 1 to detect the robot's movement and nearby objects and control the robot. The control module 150 may be implemented as a software module or a chip implemented in hardware.

In an embodiment, a display unit 31a, a camera 31b, and a microphone 31c for receiving a command from a user or outputting information may be disposed on one side of a front surface of the top cover 31 as sensors.

Also, a display unit 20 is disposed on one side of the middle cover 32 in addition to the display unit 31a of the top cover 31.

Depending on the robot's functions, both or only one of the two display units 31a and 20 may output information.

Various obstacle sensors 220 (see FIG. 2) like 35a and 35b are disposed on one side surface or an entire bottom portion of the robot 1. In an embodiment, the obstacle sensors include a time-of-flight (ToF) sensor, an ultrasonic sensor, an infrared sensor, a depth sensor, a laser sensor, a LiDAR sensor, etc. The sensors detect obstacles outside the robot 1 in various ways.

Also, the robot of FIG. 1 further includes a moving unit, which is an element for moving the robot, on the bottom portion. The moving unit is an element for moving the robot like a kind of wheel and moves the robot.

The shape of the robot of FIG. 1 is merely an example, and the present invention is not limited thereto. Also, various cameras and sensors of the robot may be disposed at various locations of the robot 1. In an embodiment, the robot of FIG. 1 is a guide robot for providing information to a user, moving to a specific point, and guiding the user.

In addition, the robot of FIG. 1 may include a robot of providing a cleaning function, a security function, or other functions.

In an embodiment, a plurality of such robots of FIG. 1 are disposed in a service space to perform specific functions (guiding, cleaning, security, luggage storage, etc.). In this process, the robot 1 may store its location, and the robot 1 may check its current location in the entire space and generate a path necessary to move to a target point.

The robot of FIG. 1 may refer to a machine of automatically processing a given task or working according to its own abilities. In particular, a robot having a function of recognizing an environment, performing self-determination, and performing an operation may be referred to as an intelligent robot.

The robot may be classified as an industrial robot, a medical robot, a household robot, a military robot, or the like depending on a purpose or field of use.

The robot may have a driving unit including an actuator or a motor to perform various physical operations such as the movement of a robot joint, etc. Also, a movable robot may include a wheel, a brake, a propeller, etc., in the driving unit, and thus may travel on the ground or fly in the air through the driving unit.

Figure 2:
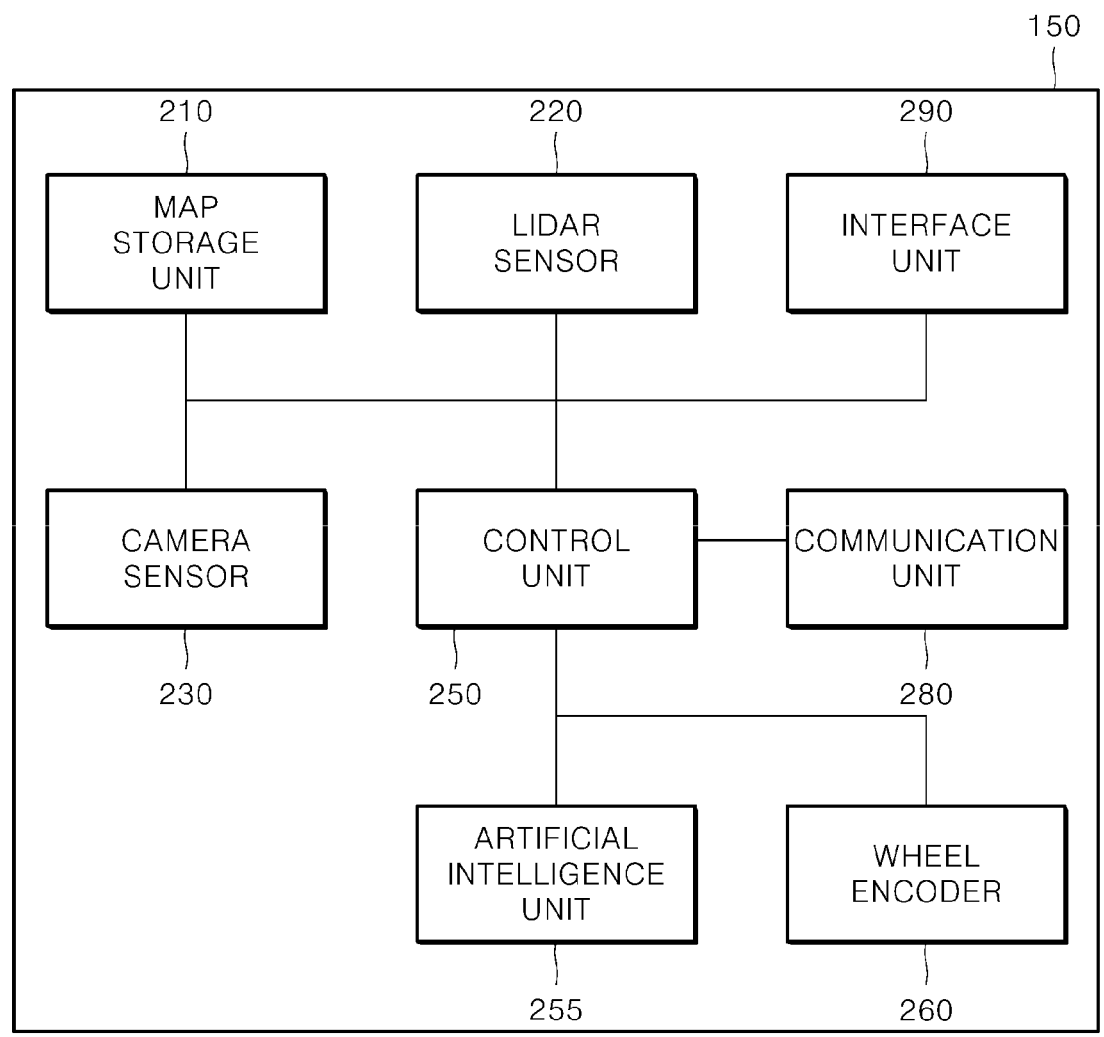
FIG. 2 shows elements of a control module of the robot according to an embodiment of the present invention.

FIG. 2 shows elements of the control module of the robot according to an embodiment of the present invention. The control module 150 controls the robot to perform both of a function of generating a map and a function of estimating the robot's location using the map.

Alternatively, the control module 150 may control the robot to provide only the function of generating the map.

Alternatively, the control module 150 may control the robot to provide only the function of estimating the robot's location using the map. That is, the control module 150 may control the robot to generate the map, estimate the location using the map, or perform both of the two functions.

Hereinafter, the robot of the present invention may communicate with a cloud server to provide the function of generating the map or the function of estimating the location of the robot. Additionally, the robot may provide a function of generating or modifying the map.

The robot may transmit information acquired by sensors during a moving process to the cloud server. The types of sensors will be described below.

First, a LiDAR sensor 220 may sense nearby objects in two dimensions or in three dimensions. The two-dimensional (2D) LiDAR sensor may sense the location of an object in the range of 360 degrees or less with respect to the robot. LiDAR information obtained through the sensing at a specific location is example sensor data.

Alternatively, the sensor data obtained through the LiDAR sensor 220 may be referred to as a LiDAR frame. That is, the LiDAR sensor 220 senses a distance between a robot and an object disposed outside the robot to generate a LiDAR frame.

In an embodiment, a camera sensor 230 is a general camera. Two or more camera sensors 230 may be used to overcome limitations on viewing angles. Images captured at a specified location form image information. That is, in an embodiment, image information generated by the camera sensor 230 photographing an object disposed outside the robot is example sensor data.

Alternatively, the sensor data obtained through the camera sensor 230 may be referred to as a visual frame. That is, the camera sensor 230 photographs the outside of the robot and generates a visual frame.

The robot 1 according to the present invention performs simultaneous localization and mapping (SLAM) using any one or both of the LiDAR sensor 220 and the camera sensor 230.

During the SLAM process, the robot 1 may perform map generation or location estimation using the LiDAR frame and the visual frame independently or in combination.

An interface unit 290 receives information from a user. The interface unit 290 receives various information such as a touch input and a voice input from a user and outputs a corresponding result. Also, the interface unit 290 may output a map stored in the robot 1 or may output a robot moving route overlapped with the map.

Also, the interface unit 290 may provide predetermined information to the user.

A control unit or controller 250 generates a map, which will be described below, and estimates the location of the robot in the robot moving route on the basis of the map. Alternatively, the control unit 250 may transmit or receive information in communication with the cloud server and may generate a map or estimate the location of the robot on the basis of the information.

A communication unit or communication device 280 may enable the robot 1 to transmit or receive information in communication with another robot or an external cloud server.

A map storage unit or storage device 210 stores a map of the space where the robot moves around. In particular, in an embodiment, this map is a map that is synchronized with the cloud server. The map storage unit 210 may be selectively held by the robot. For example, the robot 1 may use a map stored in the cloud server instead of storing a map.

A wheel encoder 260 collects information about the rotation, direction, and the like of a wheel forming the moving unit of the robot, generates wheel odometry information, and provides the wheel odometry information to the control unit 250. The control unit 250 may calculate a moving distance or a moving direction on the basis of the information provided by the wheel encoder 260.

FIG. 2 is summarized as follows. When a first sensor (a camera sensor, a LiDAR sensor, or a sensor configured to generate high-capacity sensor data) acquires sensor data necessary for the robot to perform SLAM, a communication unit transmits the sensor data to a cloud server 300.

Also, the control unit 250 generates the sensor data, a feature extracted from the sensor data, or the last frame.

Also, the communication unit 280 transmits the sensor data, the feature, or the last frame to the cloud server and receives a local map patch or a global pose from the cloud server. Also, the control unit 250 controls the movement of the robot using the feature and the local map patch or the global pose.

Figure 3:
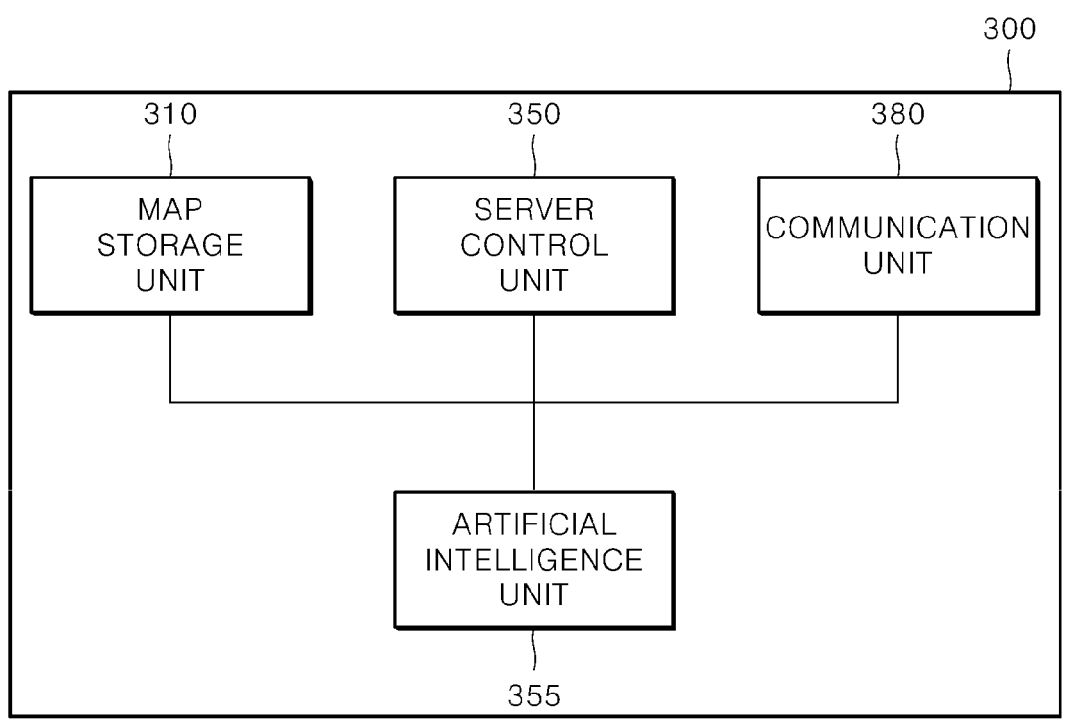
FIG. 3 shows a configuration of a cloud server according to an embodiment of the present invention.

FIG. 3 shows a configuration of the cloud server according to an embodiment of the present invention. A map storage unit or storage device 310 stores a map generated with high quality. The map of the map storage unit 310 may be partially or entirely transmitted to the robot 1. A communication unit or communication device 380 communicates with the robot 1. In this process, the communication unit 380 may communicate with a plurality of robots 1.

Also, an artificial intelligence unit 355 may extract features while generating or updating the map or may match the extracted features to the map or the like. A server control unit or controller 350 controls the above-described elements, generates various information necessary for the robot 1 to perform SLAM, and provides the generated information to the robot 1.

The cloud server 300 forms a cloud system. The cloud system is composed of a plurality of robots and one or more cloud servers 300. The cloud server may process large-capacity/high-performance computation and thus may quickly create a high-quality map using SLAM.

That is, the cloud server 300 may perform SLAM using as much information as possible with high computing power. As a result, it is possible to significantly improve the quality of the map created by the cloud server 300. When the communication unit 380 receives the sensor data transmitted by the robot 1, the server control unit 350 may perform feature extraction, map generation, map update, and the like on the basis of the received sensor data. When the robot is kidnapped, the server control unit 350 may recover the location of the robot (kidnap recovery) or provide information necessary for the kidnap recovery.

In a scheme composed of the robot of FIG. 2 and the cloud server of FIG. 3, among functions for the SLAM, mapping does not require real-time processing, but localization requires real-time processing. Accordingly, in order to quickly perform the SLAM between the cloud server 300 and the robot 1, it should be possible to perform real-time localization while minimizing the amount of data to be transmitted.

Each of the server control unit 350 and the control unit 250 of the robot 1 consists of a plurality of software or hardware submodules. Each of these submodules is as follows. These submodules are classified on a function basis, but actually may form one piece of software or one piece of hardware.

The control unit 250 of the robot 1 includes a feature extraction and matching (FEM) submodule, a local mapper (LM) submodule, a global pose tracker (GPT) submodule, and a navigation submodule. The FEM submodule may be included in the control unit 250 and also may be included in an artificial intelligence unit 255.

The server control unit 350 includes a deep feature extraction and matching (DFEM) submodule, a loop detector (LD) submodule, a global mapper (GM) submodule, a vocabulary tree (VT) submodule, a kidnap recovery (KR) submodule, and a map management (MM) submodule.

The server control unit 350 of FIG. 3 may generate a global pose of each robot or generate a map on the basis of sensor data transmitted by the robot. Alternatively, the server control unit 350 generates a local map patch of each robot. A robot that has received the local map patch or global pose generated by the server control unit 350 may perform location estimation (localization).

Figure 4:
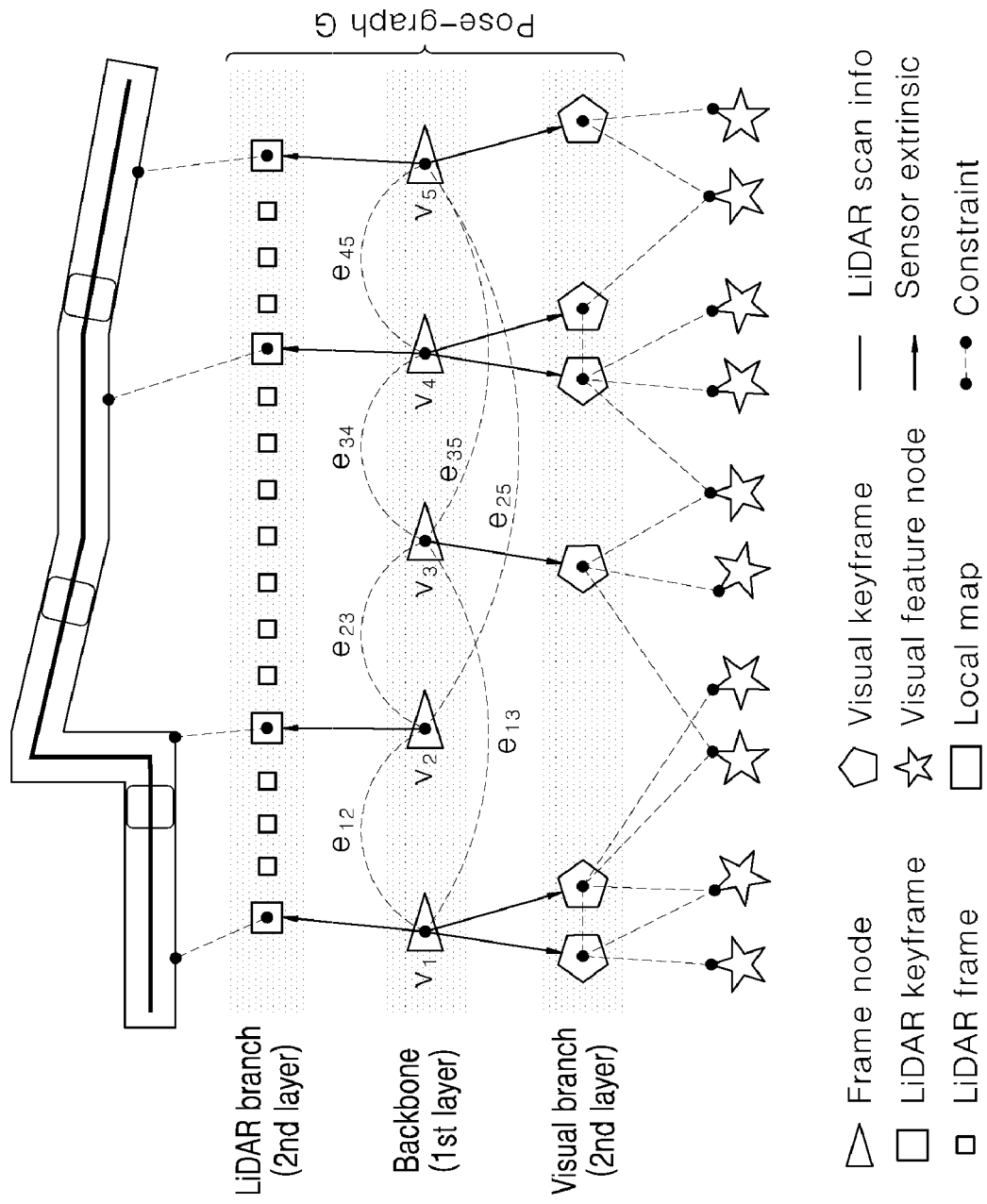
FIG. 4 shows the structure of a map according to an embodiment of the present invention.

FIG. 4 shows a structure of the map according to an embodiment of the present invention. The map of FIG. 4 is a map that is used by a robot using both of the LiDAR sensor 220 and the camera sensor 230 during a SLAM process. Accordingly, a map held by a robot having only one sensor may include only data associated with a corresponding sensor. That is, a map including only a portion of the map proposed in FIG. 4 may be stored in the map storage unit 210 of the robot or in the map storage unit 310 of the cloud server 300 depending on the robot's sensor performance.

FIG. 4 shows a dual-layer configuration having a backbone as a first layer and a LiDAR branch and a visual branch as a second layer. The structure as shown in FIG. 4 is called a structurally elastic pose graph-based SLAM.

The backbone is information obtained by tracking the robot's trajectory. Also, the backbone includes one or more frame nodes corresponding to the trajectory. Also, each of the frame nodes further includes constraint information or constraint conditions with respect to the other frame nodes. An edge between nodes indicates the constraint information. The edge means odometry constraint information or loop constraint information.

Also, the LiDAR branch of the second layer is composed of LiDAR frames. Each of the LiDAR frames includes a LiDAR sensing value obtained during a robot moving process. At least one of the LiDAR frames may be set as a LiDAR keyframe.

The LiDAR keyframe correlates with a backbone node. In FIG. 4, among backbone nodes v1 to v5, v1, v2, v4, and v5 indicate LiDAR keyframes.

Likewise, the visual branch of the second layer is composed of visual keyframes. Each of the visual keyframes indicates one or more visual feature nodes, each of which is a camera sensing value (i.e., an image captured through a camera sensor) obtained through a robot moving process. The robot may generate a plurality of visual feature nodes depending on the number of camera sensors disposed in the robot.

That is, the map structure of FIG. 4 has a configuration in which the LiDAR keyframe or the visual keyframe is connected to a backbone frame node. It will be appreciated that both of the LiDAR keyframe and the visual keyframe may be connected to one frame node (v1, v4, and v5).

LiDAR or visual keyframes connected to the frame nodes have the same robot pose. However, an extrinsic parameter may be added to each keyframe depending on a location to which the LiDAR sensor or the camera sensor is attached in the robot. The extrinsic parameter means relative location information about a location to which a sensor is attached with respect to the center of the robot.

The visual keyframe correlates with a backbone node. In FIG. 4, among the backbone nodes v1 to v5, v1, v3, v4, and v5 indicate visual keyframes. In FIG. 2, two visual feature nodes (visual frames) constitute one pair, which means that the robot 1 includes two camera sensors 230 to perform image capture. As the number of camera sensors 230 increases or decreases, the number of visual feature nodes at each location correspondingly increases or decreases.

Multiple edges are shown between the nodes v1 to v5 constituting the backbone of the first layer. e12, e23, e34, and e45 indicate edges between adjacent nodes, and e13, e35, and e25 indicate edges between non-adjacent nodes.

Odometry constraint information, which is also simply referred to as odometry information, means constraint conditions between adjacent frame nodes such as e12, e23, e34, and e45. Loop constraint information, which is also simply referred to as loop information, means constraint conditions between non-adjacent frame nodes such as e13, e25, and e35.

The backbone consists of a plurality of keyframes. In order to add the plurality of keyframes to the backbone, the control unit 250 may perform an initial mapping process. Through the initial mapping, a LiDAR keyframe and a visual keyframe are added to the backbone on a keyframe basis.

The structure of FIG. 4 is summarized as follows. The LiDAR branch includes one or more LiDAR frames. The visual branch includes one or more visual frames.

The backbone includes two or more frame nodes with which any one or more of the LiDAR frame and the visual frame are registered. In this case, the LiDAR frame or the visual frame registered with the frame node is referred to as a keyframe. Also, a pose graph includes the LiDAR branch, the visual branch, and the backbone.

In addition, the pose graph includes odometry information, loop information, and the like between frame nodes. The odometry information includes the rotation or direction of a wheel generated by the robot moving between frame nodes. The loop information is based on a set of frame nodes connected between visual keyframes centering on a specific frame node within a maximal sensing distance of the LiDAR sensor 220 according to a specific constraint condition.

The pose graph of FIG. 4 is generated by the server control unit 350 of the cloud server. The server control unit 350 stores the LiDAR branch, the visual branch, the backbone, the odometry information between frame nodes, and the pose graph including the LiDAR branch, the visual branch, the backbone, and the odometry information in the map storage unit 310 of the cloud server 300. Also, the pose graph may be shared with the robot 1 and stored in the map storage unit 210 of the robot 1.

That is, the map storage unit 310 of the cloud server 300 and the map storage unit 210 of the robot 1 stores the LiDAR branch including a plurality of LiDAR frames that are comparable to a first LiDAR frame acquired by the LiDAR sensor 220. Also, the map storage unit 210 stores the visual branch including a plurality of visual frames that are comparable to a first visual frame acquired by the camera sensor 230.

The map storage unit 210 stores a pose graph including the backbone including two or more frame nodes with which one or more of the stored LiDAR frame and the stored visual frame are registered. Also, the map storage unit 210 stores the odometry information between the frame nodes.

In particular, the pose graph of FIG. 4 may be used by the robot 1 to perform location estimation even when only one of the camera sensor 230 and the LiDAR sensor 220 is operable. Alternatively, when any one of the sensors of the robot has low accuracy or when a plurality of locations corresponding to information acquired by any one sensor are detected, the robot 1 may increase accuracy in location estimation using another sensor.

For example, the robot 1 including one or more camera sensors 230 and one or more LiDAR sensors 220 may perform location estimation using information acquired by the multiple sensors through fusion-SLAM. When any one of the location estimation results obtained using the sensors is true, the robot 1 may perform location estimation.

Alternatively, when only some of the sensors of the robot 1 are operable or even when the robot 1 includes only one sensor, the robot 1 may perform location estimation using sensor-specific information stored in the map storage unit 210. When one LiDAR sensor 220 is used, the LiDAR sensor 220 may cover 360 degrees.

Also, when all the sensors of the robot 1 is in operation, the control unit 250 may control when the sensors perform sensing to adjust when the sensors acquire information or when the acquired information is processed.

By the robot 1 considering the time it takes for each sensor to acquire and process data, it is possible to solve a synchronization problem that occurs when estimating a location using various sensors.

Also, the robot 1 may check the location on the basis of any one sensor according to the speed or quality of communication with the cloud server.

Also, when the communication between the cloud server 300 and the robot 1 or the SLAM using the LiDAR sensor 220 and the camera sensor 230 does not proceed smoothly, the control unit 250 of the robot 1 may perform the SLAM using wheel odometry (WO). The wheel odometry is information calculated on the basis of the rotation, direction, and speed information of the wheel acquired by the wheel encoder 260.

Visual odometry (VO) is information calculated using visual data acquired by the camera sensor 230. LiDAR odometry (LO) is information calculated using LiDAR data (LiDAR scan data) acquired by the LiDAR sensor 220.

When the robot processes WO, VO, and LO, the time it takes for each sensor to acquire and process data may be different depending on the types of sensors 220, 230, and 260 and the characteristics of data generated by the sensors.

The robot 1 and the cloud server 300 performs the SLAM through two steps. That is, the cloud server 300 may generate a map using sensor data acquired from a mapping sequence by the robot 1.

Next, the location estimation (localization) may be performed by checking the location of the robot through the map.

Figure 5:
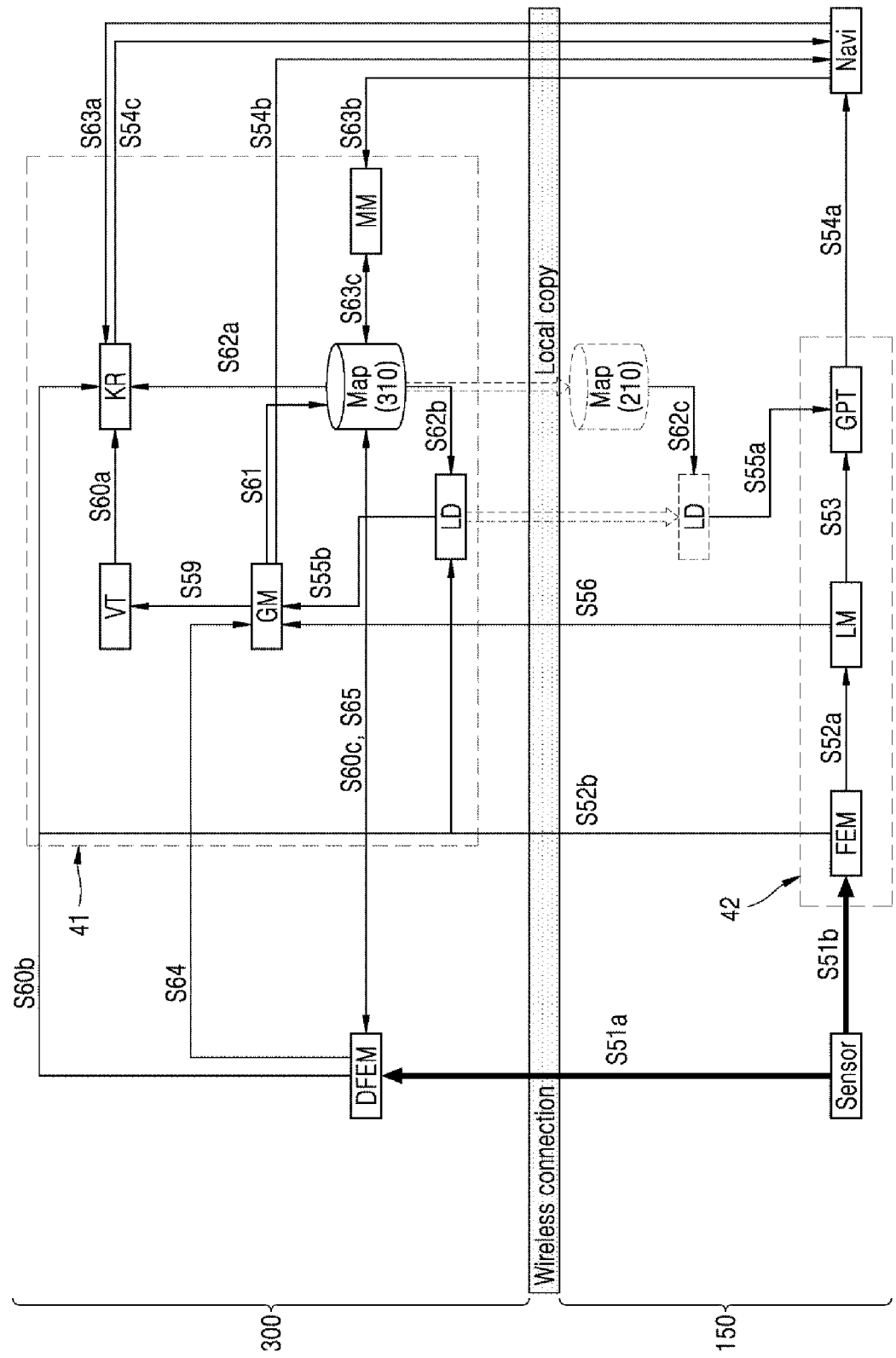
FIG. 5 shows operational processes of submodules according to an embodiment of the present invention.

FIG. 5 shows operational processes of the sub-modules according to an embodiment of the present invention. A process of performing the SLAM between the cloud server 300 and the control module 150 of the robot 1 and transmitting or receiving information through submodules associated with the SLAM will be shown.

A part indicated by reference numeral 41 represents submodules of the cloud server 300 associated with mapping and kidnap recovery, and a part indicated by reference numeral 42 represents submodules of the robot 1 associated with mapping and location estimation.

The cloud server 300 and the robot 1 may communicate with each other through wireless connection.

Here, a sensor refers to the LiDAR sensor 220 or the camera sensor 230 of FIG. 1. In addition, an ultrasonic sensor, an infrared sensor, and the like are included. As the precision of the sensor increases, the size of sensor data generated by the sensor increases. Accordingly, the sensor data has heavy-data attributes. The control module 150 transmits the sensor data to the cloud server 300 (S51*a*). Also, the sensor data acquired by the sensor is provided even to the FEM submodule (S51*b*).

The data is transmitted or received between the cloud server 300 and the control module 150 of the robot (S51*a*).

The FEM submodule transmits a feature to the cloud server 300 (S52*b*). The last frame is transmitted (S56). Global pose information is transmitted (S54*b* and S54*c*). A request or response is transmitted between the control module 150 and the cloud server (S63*a* and S63*b*).

Also, the sensor data is provided to the FEM submodule in the control module 150 (S51*b*), and the FEM submodule performs feature extraction and matching on the sensor data to generate a feature. Also, the FEM submodule provides the feature to the LM submodule (S52*a*).

The LM submodule performs local mapping and calculates a local pose using feature data (S53). Also, the GPT submodule tracks a global pose. In more detail, the GPT submodule receives the local pose from the LM submodule and receives loop constraints from the LD submodule (S53 and S55*a*) and then generates a global pose (S54*a*). As a result, the control module 150 performs navigation on the basis of the global pose. The LD submodule performs loop detection.

Meanwhile, the map storage unit 210 of the robot provides a local map patch to the LD submodule (S62*c*).

In addition, the Navi submodule may receive the global pose from the cloud server 300 (S54*b* and S54*c*) and may control the moving unit of the robot to move the robot on the basis of the global pose.

The LD submodule provides the loop constraints to the GM submodule (S55*b*).

The DFEM submodule provides a feature based on nodes to the GM submodule. This process may perform deep learning. The DFEM submodule may generate deep features combined with generated nodes as the features based on the nodes (S64).

Also, the DFEM submodule may generate a map on the basis of a deep learning network and may store the generated map in the map storage unit 310 (S65).

The DFEM submodule or the VT submodule provides a candidate node necessary for the KR submodule to perform kidnap recovery (S60*a* and S60*b*). A vocabulary tree provides information necessary to increase search accuracy for the candidate node.

The GM submodule may provide nodes in the map to a global mapper (S59). In an embodiment, the provided node is a 3D visual node.

Also, the GM submodule updates the map of the map storage unit 310 (S61). In an embodiment, the entirety of the pose graph according to the aforementioned embodiment is updated.

Also, the map storage unit 310 provides the local map patch to the KR submodule and the LD submodule (S62*a* and S62*b*).

Table 1 shows each piece of sensor data and a field where the sensor data is used according to an embodiment of the present invention.

TABLE 1

| Data Name | Process | Application Field |
| --- | --- | --- |
| Sensor Data | S51a, S51b | MAPPING, LOCALIZATION, KIDNAP RECOVERY |
| Feature | S52a | MAPPING, LOCALIZATION |
|  | S52b | KIDNAP RECOVERY |
| Local Pose | S53 | MAPPING, LOCALIZATION |
| Global Pose | S54a | MAPPING |
|  | S54b | LOCALIZATION |
|  | S54c | KIDNAP RECOVERY |
| Loop Constraint | S55a, S55b | MAPPING |
| Last Frame | S56 | LOCALIZATION |

TABLE 1-continued

| Data Name | Process | Application Field |
|---|---|---|
| 3D Node Set | S59 | MAPPING |
| Candidate Node | S60a | KIDNAP RECOVERY |
|  | S60b | KIDNAP RECOVERY |
| Map Update | S61 | MAPPING |
| Local Map Patch | S62a, S62b, S62c | MAPPING, LOCALIZATION |
| Request/Response | S63a | KIDNAP RECOVERY |
|  | S63b, S63c | MAPPING |
| Deep Features with nodes | S64 | MAPPING |
| Deep Learning Network | S65 | LOCALIZATION, KIDNAP RECOVERY |

The data delivered in S51a and S51b includes image sensor data captured by the camera sensor 230 and wheel odometry data generated by the wheel encoder 260. Alternatively, the data delivered in S51a and S51b includes LiDAR sensor data acquired by the LiDAR sensor 220 and wheel odometry data generated by the wheel encoder 260. The data may be managed by the control unit 250 or the control module 150 of the robot. The image sensor data may be included in the above-described visual odometry (VO).

In S52a and S52b, a result of the feature extraction and matching is calculated.

S53 indicates the local pose. In an embodiment, the local pose may be the last VO pose, a relative VO pose, or a new keyframe.

The data delivered in S54a and S54c may include the global pose and information regarding correcting transform. S54b may include the information regarding the correcting transform.

The data delivered in S55a and S55b includes loop constraints at a loop edge. The data includes a relative pose from a nearby node.

In S56, the last frame acquired during the visual odometry process is delivered.

In S59, the 3D visual nodes may be calculated by the GM submodule.

S60a and S60b indicate a process of generating a candidate node. S61 is a process of fully updating a global optimization result map. The entirety of the pose graph may be updated.

S62a, S62b, and S62c indicate a process of searching the pose graph for a loop candidate. In an embodiment, a candidate may be discovered in the pose graph and then delivered.

In S63a, a message to request kidnap recovery is delivered from the robot. In S63b, a message to request map management is delivered.

The cloud server 300 and the submodules of the control module 150 will be described in detail along with the mapping and location estimation process.

Figure 6:
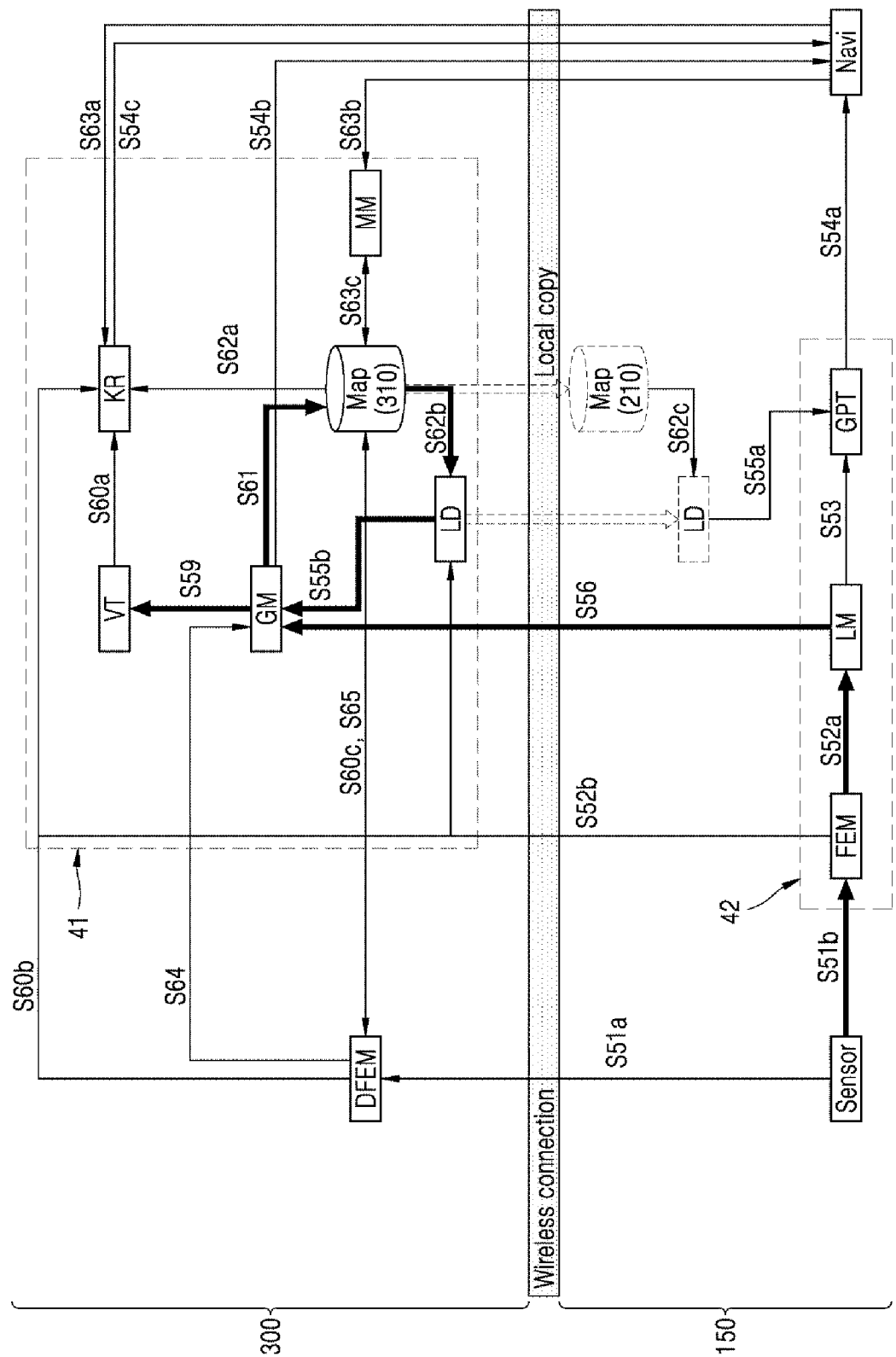
FIG. 6 shows a process in which a cloud server and a robot perform mapping according to an embodiment of the present invention.

FIG. 6 shows a process in which the cloud server and the robot perform mapping according to an embodiment of the present invention. The mapping process (mapping sequence) proceeds with S51b, S52a, S56, S59, S61, S62, and S55b. This process may be repeated when the LiDAR sensor 220 acquires LiDAR sensor data or when the camera sensor 230 acquires camera sensor data.

In the mapping process, the sensor data is extracted by the FEM submodule as features, and the last frame is delivered to the GM submodule of the cloud server 300 through the LM submodule. Here, the LD submodule of the cloud server 300 provides loop constraints to the GM submodule.

The GM submodule generates a map using the provided loop constraints and stores the generated map in the map storage unit 310. Such updated map information is transmitted again to the map storage unit 210 of the control module 150 of the robot, and thus the map storage units 210 and 310 of the two apparatuses store the same map information.

Also, the GM submodule delivers a portion of the map (a local map patch) to the GPT submodule of the robot so that the local map patch may be utilized for location estimation. This process is achieved in S62b, S62c, and S55a.

The process of FIG. 6 may be repeated by the robot transmitting LiDAR sensor data or image sensor data to the cloud server 300 to generate a map when the robot acquires the LiDAR sensor data or image sensor data while moving around.

Also, by periodically uploading images as a whole in a separate process distinct from the process of FIG. 6 and also applying deep learning, learning may be performed in association with the pose graph nodes shown in FIG. 4. Also, the images may be associated with location information.

As shown in FIG. 6, when the robot collects sensor data and transmits the sensor data to the cloud server 300, it is possible to generate a map without information loss due to the large storage space and high computing and processing capacity of the cloud server. Also, the robot may use the generated map to perform SLAM.

As a result, by overcoming conventional problems, such as a small storage space and a low computing and processing capacity, caused when a robot performs SLAM, it is possible to accurately perform the SLAM.

Summarizing the operation of the control module 150 of the robot in the process of FIG. 6, the control unit 250 extracts a feature from the sensor data in the mapping process to generate the last frame, which is a local mapping result. Also, the communication unit 280 transmits the last frame to the cloud server 300.

The communication unit 380 of the cloud server 300 generates a set of nodes using the received last frame. This includes a process of the GM submodule providing the set of nodes to the VT submodule using the received last frame and a process of the GM submodule receiving loop constraints from the LD submodule (S55b) and updating the map using the loop constraints (S61).

Also, when the map is updated, the LD submodule receives a local map patch. In this process, the map storage unit 310 of the cloud server 300 may be synchronized with the map storage unit 210 of the robot. As a result of the synchronization, a local map patch like S62c is obtained. The map synchronization is achieved through a wireless connection and is partially changed like a local copy.

Meanwhile, while the cloud server 300 and the robot 1 cannot communicate with each other in the mapping process, the control unit 250 of the robot 1 stores the acquired sensor data in chronological order. Also, while the communication unit 280 can communicate with the cloud server 300, the communication unit 280 transmits the sensor data to the cloud server.

In this case, when the communication is not possible, the control unit 250 performs local mapping to store the sensor data. Also, in this process, the control unit 250 controls the communication unit 280 such that a local map patch or a global pose is not received from the cloud server 300.

Meanwhile, when the communication unit 380 of the cloud server 300 receives the last frame from the robot, the server control unit 350 updates the map using the last frame. In detail, the server control unit 350 updates the map of the map storage unit 310 using the last frame and loop constraints generated through a loop detector. Subsequently, the server control unit 350 performs a local map patch necessary to generate the loop constraints.

Also, when the map update is complete, the communication unit 380 synchronizes the map storage unit 310 with the map storage unit 210 of the robot.

Figure 7:
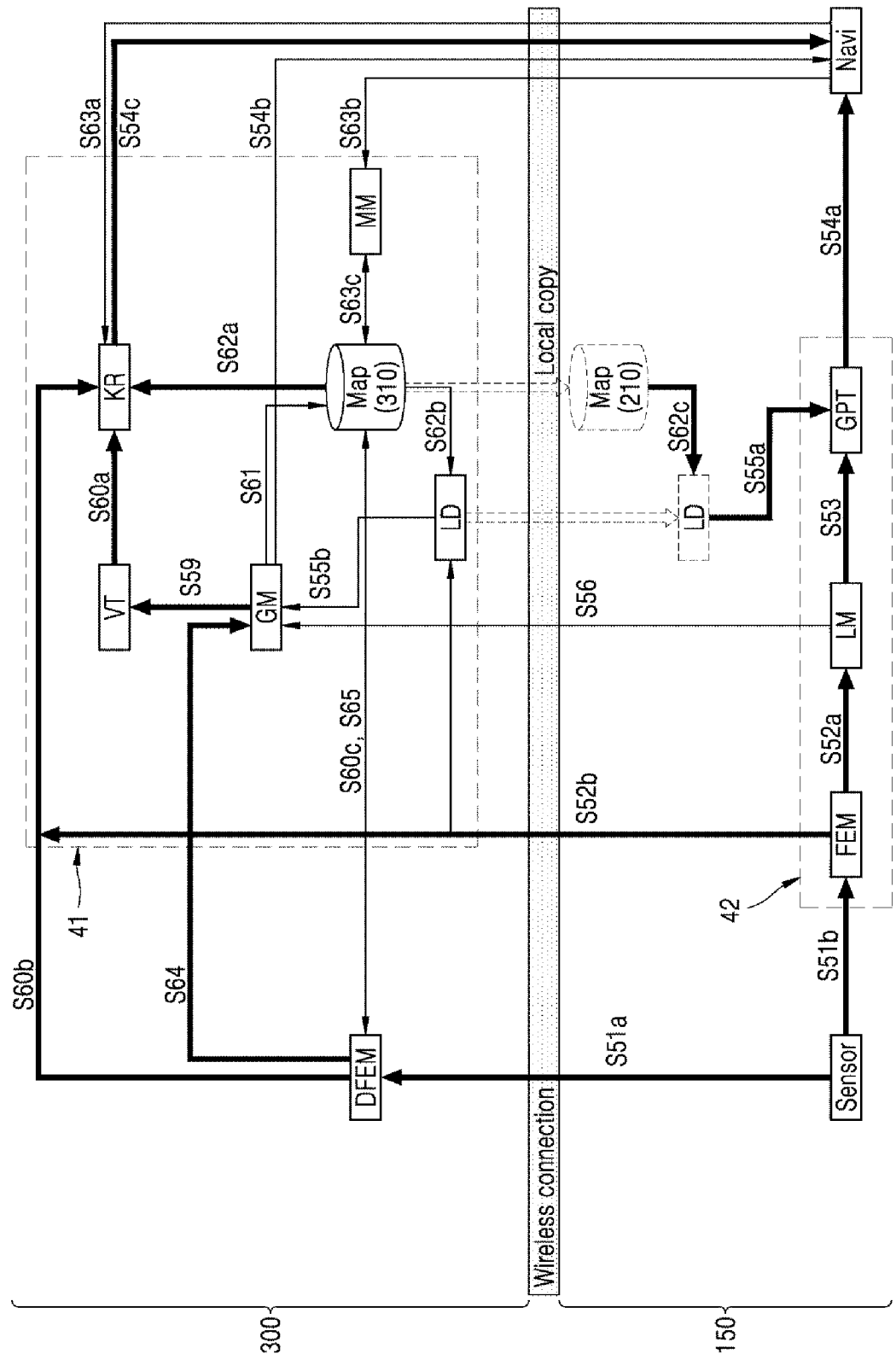
FIG. 7 shows a location estimation process according to an embodiment of the present invention.

FIG. 7 shows a location estimation process according to an embodiment of the present invention.

The process performed in the cloud server 300 includes S51a, S52b, S60b, S64, S60a, S62a, and S54c. The process performed in the control module 150 of the robot includes S51b, S52a, S53, S54a, S55a, and S54a.

The LM submodule transmits the last frame to the GM submodule of the cloud server, and the GPT submodule receives a portion of the entire map, i.e., the portion is a local map patch, and generates a global pose as a final output result.

In the location estimation process, image sensor data having a large data size may be processed using the cloud server in the process of FIG. 7. In this case, whether to use LiDAR sensor data is determined by whether to perform fusion SLAM.

Alternatively, the LiDAR sensor data may also be performed using the cloud server in the process of FIG. 7.

Next, the kidnap recovery will be described. The navigation submodule (Navi) transmits a global kidnap recovery (GKR) message to the KR submodule of the cloud server 300 (S63a). In response to this message, the VT submodule and the DFEM submodule of the cloud server 300 searches for a candidate node and performs motion validation. Also, like S54c, a global pose is provided to the navigation submodule as a final result.

In the location estimation process, the control unit 250 of the robot 1 extracts a feature from the sensor data and performs local mapping to generate a local pose (S53). Also, the communication unit 280 transmits the sensor data and the feature to the cloud server 300 (S51 and S52b) and receives the local map patch from the cloud server (S62c and S55a). The reception of the local map patch may be performed in the map update process. That is, the robot 1 may perform map update after receiving information for the map update (the local map patch).

The control unit 250 of the robot 1 generates loop constraints using the local map patch and then generates a first global pose (S54a). Also, the communication unit 280 receives a second global pose (S54c). The control unit 250 controls the movement of the robot using the first global pose and the second global pose.

The server control unit 350 generates the local map patch on the basis of the sensor data and feature transmitted by the robot, and the communication unit 380 transmits the generated local map patch to the robot. In this process, map synchronization may be performed. Then, the local map patch may be transmitted/received or generated in the map synchronization process.

The above processes of FIGS. 5 to 7 may exhibit high performance to process information in bulk or at high speed when the sensor data has a large size. For example, when a high-performance and high-quality camera sensor generates image sensor data at a very high speed, in order to perform SLAM based on this data, the cloud server 300 may receive the data, perform mapping or location estimation, and then provide a result of the mapping or the location estimation to the robot.

Since a large amount of data may be transmitted or received over a network, the robot or the cloud server can overcome a network overload or a network transmission delay caused by the transmission of a large amount of data by limiting data transmission conditions or performing an exception operation.

Figure 8:
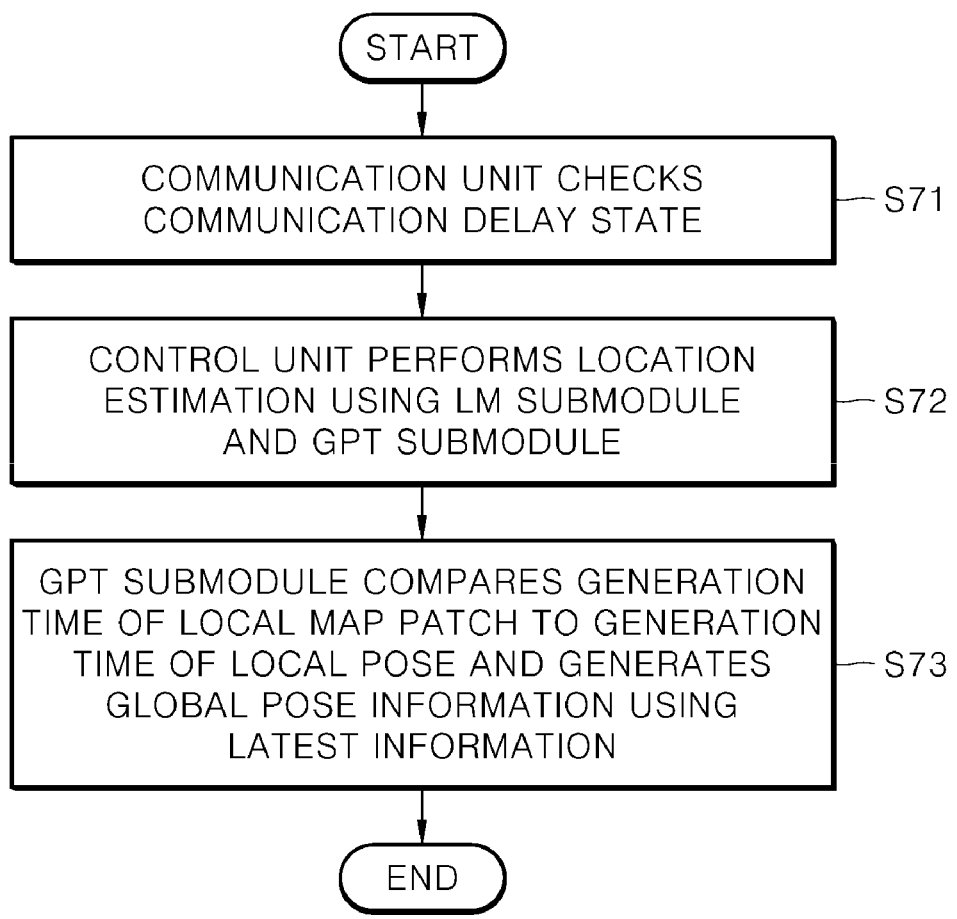
FIG. 8 shows a process of estimating locations when a communication delay occurs according to an embodiment of the present invention.

FIG. 8 shows a process of estimating locations when a communication delay occurs according to an embodiment of the present invention.

The communication unit 280 monitors a communication state with the cloud server to check whether a communication delay occurs (S71). Also, the control unit 250 performs location estimation (localization) using the LM submodule and the GPT submodule (S72). In this case, wireless communication connection is delayed as shown in FIG. 5, and thus the GPT submodule checks the generation time of the local map patch (S62c) received from the cloud server. Also, the GPT submodule checks the generation time of the local pose information generated by the LM submodule.

When a result of comparing the two times is that the generation point of time of the local map patch is earlier than that of the local pose, the local map patch is old information, and thus the GPT submodule generates a global pose using the local pose (S73).

On the other hand, when the generation point of time of the local map patch is the same as or later than the generation point of time of the local pose, the GPT submodule generates the global pose using both of the local map patch and the local pose.

When a communication delay occurs in the mapping process, the need for real time generation is not high. Accordingly, only when a communication delay occurs in the location estimation, the robot may determine whether to use the local pose or the local map patch.

That is, by comparing the generation time of the local map patch transmitted by the cloud server 300 to that of the local pose generated by the control unit 250 and generating the global pose using the latest information, the control unit 250 increases the location estimation accuracy in the location estimation process.

FIG. 9 shows a process of performing kidnap recovery when a communication delay occurs according to an embodiment of the present invention.

When kidnap recovery occurs, a large amount of data that is actually transmitted by the robot to the cloud server is sensor data. Also, information received by the robot from the cloud server is a correcting transform for performing location modification in the previous global pose, and thus the size of this data is not large.

Accordingly, the sensor data needs to be seamlessly transmitted to the cloud server. Thus, when the communication unit checks a communication delay state (S75), the control unit checks a communication state to check a transmission state and transmission success rate of the sensor data (S76).

Also, when the transmission success rate of the sensor data is lower than or equal to a certain reference, the control unit pauses or slows down the robot.

This is because when the robot moves quickly, images may not be properly used. Accordingly, when a kidnap recovery motion is performed, the robot speed may be controlled to be low due to the communication delay.

For example, when the moving speed of the robot is V and the communication transmission speed is K, the control unit may control the speed of the robot as follows. Here, a is a constant, and b is zero or greater and may selectively have a value of zero or greater in the kidnap recovery process.

$$V = aK - b \qquad \text{[Equation 1]}$$

When the communication transmission speed is high, the cloud server can receive a large amount of data, and thus it is possible to increase the moving speed of the robot. However, for the kidnap recovery, it is possible to decrease the moving speed of the robot by setting b to be greater than zero. When a communication delay occurs during the kidnap recovery process, K decreases, and thus the speed of the robot decreases.

When communication is not delayed but disconnected, data cannot be transmitted or received between the cloud server 300 and the control module 150 of the robot 1. Accordingly, the loop constraints are not transmitted to the cloud server 300 in the mapping process, and no map is generated in the server. In this case, data or messages that have not been transmitted to the cloud server 300 may be accumulated in the form of a queue in the control module 150 of the robot.

Then, when the communication is restored, the control module 150 may transmit the accumulated data or messages to the cloud server 300, and the cloud server 300 may generate a map. When the communication is disconnected, the robot may travel using local pose information generated by the LM submodule.

Also, when the communication is disconnected in the location estimation process, the GPT submodule cannot receive the local map patch generated by the cloud server.

Accordingly, for the robot, the LM submodule performs only the local mapping with respect to the current location. In the short term, the robot may travel without moving far from the location at which the communication is disconnected. A location error may increase or decrease depending on the performance of the LM submodule. However, when the period for which the communication is interrupted increases, the period for which the existing map cannot be utilized increases, and thus the location error increases gradually.

Since data transmission/reception is not possible when communication is disconnected in the kidnap recovery process, the robot slows down and monitors the communication connection state.

Also, data transmission/reception conditions between the robot and the cloud server may be set differently depending on the situation of the robot.

In an embodiment, it is advantageous in terms of securing performance that the robot always transmits all data to the cloud server and the cloud server processes the data, but the moving speed of the robot may be limited according to the above-described communication state. Thus, the robot may maintain communication quality by limiting the size (amount) and transmission rate of data transmitted to or received from the cloud server 300.

In addition, since real-time location estimation may become difficult due to a communication delay or disconnection, the cloud server 300 and the robot 1 may allow limited data transmission as follows. The cloud server may determine whether to allow data transmission depending on a communication state and a state of the robot in the space and may inform the robot about whether to allow data transmission.

In an embodiment, the cloud server 300 may temporarily limit the data transmission in the kidnap recovery situation. The kidnap recovery situation is a situation in which the location of the robot is estimated using an existing map when the robot is placed at any location. That is, in this case, the location of the robot cannot be estimated, and just the current location is found so as to perform a service associated with location estimation. Thus, there is no need to secure real-time characteristics. Accordingly, in this case, it is possible to limit data transmission.

Also, even when a location estimation error occurrence rate is high, data transmission may be limited. The robot may provide a service while performing location estimation. In this case, the robot estimates the location in the next step while the robot is aware of its own location. For example, the robot estimates the location at "t" while knowing the location at "t−1."

Even in this case, however, the location at "t−1" may be difficult to trust and the location at "t" may have low accuracy in the following cases. Accordingly, the robot may transmit data to the cloud server to re-find the location in the same way as the kidnap recovery.

However, this process is different from a case in which only the kidnap recovery is performed. Even when the location estimation error is high, the robot may continue to estimate the current location, compare the current location to the location information received from the cloud server 300, and check, in parallel, whether the location estimation of the robot is correct. For example, when the result of performing a comparison of location accuracy a certain number of times is that the location information provided by the cloud server has high accuracy, it is possible to replace the current location information with the location information provided by the cloud server. Therefore, in this process, data is transmitted or received between the robot and the cloud server.

In an embodiment, the location estimation error being high corresponds to a case in which the intensity of an acquired image is very low. For example, the case indicates a region under a space with no light, and the region includes a region under a bed, a region under a sofa, or a space where lights are off.

Alternatively, the location estimation error being high corresponds to a case in which the number of matching features is very small. For example, a location estimation error is likely to occur when it is difficult to find a correlation between information acquired at "t−1" and information acquired at "t." Also, any region may be determined as having a high location estimation error according to regions preset in the robot.

That is, when the communication unit 280 ascertains the delay or disconnection of communication with the cloud server 300, the control unit 250 reduces the moving speed of the moving unit. Also, the control unit 250 controls the size of data transmitted to the cloud server 300 according to an operational category (mapping, location estimation, kidnap recovery, or other task execution) of the robot.

FIG. 10 shows a process in which a cloud server sets priorities while performing a SLAM process along with robots according to an embodiment of the present invention.

When the communication state is good, robots 1a, 1b, and 1n update sensor data (S81, S82, and S83). Also, a cloud server 300 processes the received sensor data. It will be appreciated that the cloud server 300 may also receive a feature from the robots during this process.

Also, the cloud server 300 checks a communication delay state (S84). Since many robots transmit sensor data or communication equipment has a problem, communication may be delayed. In this case, the cloud server 300 calculates the priorities of the robots according to any one of the locations of the robots, the sizes of the sensor data transmitted by the robots, accuracy in location estimation of the robots, and the operation categories (mapping, location estimation, kidnap recovery, or stopping and executing a specific function) of the robots (S85). Also, the cloud server 300 transmits the priorities to the robots 1a, 1b, and 1n (S86, S87, and S88).

For example, since the location estimation of the first robot 1a is urgent and accurate, there is a need for interaction with a server, and thus the server control unit 350 of the cloud server 300 sets a high priority to the first robot 1a. Since the second robot 1b is currently stopped to perform a specific function or is in a kidnap recovery state, the server control unit 350 of the cloud server 300 determines that location estimation of the second robot 1b is not urgent, and sets a low priority to the second robot 1b.

Also, the server control unit 350 of the cloud server 300 determines that the nth robot 1n performs sufficiently accurate location estimation just using locally gathered information, and determines that server communication may be intermittent. As a result, the server control unit 350 sets a middle priority to the nth robot in.

As a result, the first robot 1a still uploads the sensor data (S91), and the second robot 1b temporarily stops transmitting the sensor data (S92). Also, the nth robot 1n lengthens a sensor data upload period to reduce the amount of data transmitted per hour (S93).

That is, the control unit 250 of a corresponding robot may set a communication scheme as a scheme indicated by a priority that is set according to any one of the location of the robot, the size of sensor data, the location estimation accuracy of the robot, and the operational category of the robot. For example, the control unit 250 may limit the size or transmission interval of data transmitted by the communication unit 280 of the robot.

Furthermore, the control unit 250 of a corresponding robot may limit the speed of the robot according to the priority. The control unit 250 of a corresponding robot may increase the speed of the robot when the sensor data can be frequently loaded and may decrease the speed of the robot when the upload of the sensor data is limited.

Also, when any robot among the robots needs to use cloud SLAM quickly while communication is delayed, the robot may transmit, to the cloud server 300, a message requesting an increase in data communication or a message requesting a raise of communication priority. Also, after the transmission, the cloud server 300 readjusts the priorities as shown in FIG. 10. As a result, the cloud server 300 may authorize a robot that needs to perform cloud SLAM right away to preferentially perform communication.

The robot may have various types of sensors as shown in FIG. 2. That is, sensor data on which SLAM is to be performed in communication with the cloud server may be image sensor data. In this case, the robot 1 transmits image sensor data generated by the camera sensor 230 to the cloud server 300. Also, the robot 1 may receive location information from the cloud server 300 and perform visual SLAM.

Additionally, when the robot 1 further includes the LiDAR sensor 220, the control unit 250 may perform fusion SLAM for controlling the movement of the robot on the basis of image sensor data calculated by the camera sensor 230 and LiDAR sensor data calculated by the LiDAR sensor 220.

In addition, when the communication with the cloud server 300 is not seamless, the robot 1 may temporarily perform location estimation using only the LiDAR sensor 220.

It will be appreciated that even when the sensor data on which SLAM is to be performed in communication with the cloud server is LiDAR sensor data, the robot 1 transmits LiDAR sensor data generated by the LiDAR sensor 220 to the cloud server 300. Also, the robot 1 may receive location information from the cloud server 300 and perform LiDAR SLAM.

On the basis of the aforementioned embodiments, the cloud SLAM allows high-quality mapping and precise localization. In particular, when the size of data to be processed along with the high precision of a camera sensor or a 3D LiDAR sensor increases, the sensor data may be processed using resources of the cloud server. By generating a high-quality map using the mass storage space and high-performance computation of the cloud server, it is possible to improve map quality and location estimation accuracy in proportion to sensor performance improvement.

Also, a robot serving as a client may perform real-time localization with only a few computations.

Also, the robot and the cloud server may change a transmission scheme, a robot movement scheme, and the like in response to communication delay and thus may flexibly respond to a communication situation.

That is, by optimizing data transmitted or received over a network between the cloud server and the robot in consideration of the moving/operational situations of the robots, the accuracy of the location estimation, etc., it is possible to guarantee high-quality mapping and high location estimation accuracy.

In particular, the cloud server 300 may increase the accuracy of the location estimation using the artificial intelligence unit 355 and specifically the DFEM submodule.

Artificial intelligence refers to a field of researching artificial intelligence or researching methodologies for creating artificial intelligence, and machine learning refers to a field of defining various problems in the field of artificial intelligence and researching methodologies for solving the problems. The machine learning is defined as an algorithm that improves the performance of a task through consistent experiences with the task.

An artificial neural network (ANN) is a model used in machine learning and may refer to any kind of model having a problem-solving capability, the model being composed of artificial neurons (nodes) forming a network by a combination of synapses. The ANN may be defined by a connection pattern between neurons in different layers, a learning process for updating model parameters, and an activation function for generating an output value.

The ANN may include an input layer and an output layer. Optionally, the ANN may further include one or more hidden layers. Each layer may include one or more neurons, and the ANN may include synapses for connecting the neurons. In the ANN, each neuron may output function values of the activation function associated with input signals, weights, and deflections that are received through the synapses.

The model parameters refer to parameters determined through learning and include synapse connection weights, neuron deflections, etc. Also, hyperparameters refer to parameters to be set before learning in a machine learning algorithm and includes a learning rate, the number of repetitions, a minimum placement size, an initialization function, etc.

The training purpose of the ANN can be regarded as determining model parameters that minimize a loss function. The loss function may be used as an index for determining an optimal model parameter during the learning process of the ANN.

The machine learning may be classified as supervised learning, unsupervised learning, or reinforcement learning depending on the learning scheme.

The supervised learning may refer to a method of training the ANN while a label for learning data is given, and the label may refer to an answer (or a result value) to be inferred by the ANN when the learning data is input to the ANN. The unsupervised learning may refer to a method of training the ANN while the label for the learning data is not given. The reinforcement learning may refer to a learning method for training an agent defined in any embodiment to select an action or a sequence of actions that maximizes cumulative reward in each state.

Machine learning implemented using a deep neural network (DNN) including a plurality of hidden layers in the ANN will be called deep learning, and the deep learning is a portion of the machine learning. In the following description, the machine learning is used as a meaning including the deep learning.

For the robot 1, the artificial intelligence unit 255, which is a sub-element of the control unit 250 that has been described above, may perform an artificial intelligence function. The artificial intelligence unit 255 in the control unit 250 may be implemented in software or hardware.

In this case, the communication unit 280 of the robot 1 may transmit or receive data to or from external apparatuses such as the cloud server 300, which will be described in FIG. 11, or a robot for providing another artificial intelligence function through wired and wireless communication technologies. For example, the communication unit 280 may transmit or receive sensor information, user inputs, learning models, controls signals, and the like to or from external apparatuses.

In this case, the communication technology used by the communication unit 280 includes Global System for Mobile Communication (GSM), code-division multiple access (CDMA), Long Term Evolution (LTE), 5G, Wireless LAN (WLAN), Wireless-Fidelity (Wi-Fi), Bluetooth, Radio-Frequency Identification (RFID), Infrared Data Association (IrDA), ZigBee, Near Field Communication (NFC), and the like.

The interface unit 290 may acquire various kinds of data.

In this case, the interface unit 290 may include a camera for receiving an image signal input, a microphone for receiving an audio signal, a user input unit for receiving information from a user, etc. Here, information acquired by the LiDAR sensor 220, the camera sensor 230, or the microphone refers to sensing data, sensor information, etc.

The interface unit 290, various kinds of sensors, the wheel encoder 260 of the moving unit, and the like may acquire input data or the like to be used when an output is acquired using a learning model and learning data for learning a model. The aforementioned elements may acquire raw input data. In this case, the control unit 250 or the artificial intelligence unit 255 may extract an input feature as a preprocessing process for the input data.

The artificial intelligence unit 255 may train a model composed of an ANN using learning data. Here, the trained ANN may be called a learning model. The learning model may be used to infer a result value not for the learning data but for new input data, and the inferred value may be used as a determination basis for the robot 00 to perform a certain operation.

In this case, the artificial intelligence unit 255 of the robot 1 may perform artificial intelligence processing along with the artificial intelligence unit 355 of the cloud server 300.

In this case, the artificial intelligence unit 255 of the robot 1 may include a memory integrated or implemented in the robot 1. Alternatively, the artificial intelligence unit 255 of the robot 1 may be implemented using a separate memory, an external memory coupled to the robot 1, or a memory held in an external apparatus.

The robot 1 may acquire at least one of internal information of the robot 1, environmental information of the robot 1, and user information using various sensors.

A memory built in the robot 1 may store data supporting various functions of the robot 1. For example, the memory may store input data, learning data, a learning model, a learning history, and the like which are acquired by the interface unit 290 or various kinds of sensors built in the robot 1.

The control unit 250 may determine at least one executable operation of the robot 1 on the basis of information determined or generated using a data analysis algorithm or a machine learning algorithm. Also, the control unit 250 may control the elements of the robot 1 to perform the determined operation.

To this end, the control unit 250 may request, retrieve, receive, or utilize data of the artificial intelligence unit or the memory and may control the elements of the robot 1 to execute a predicted operation or an operation determined as being desirable among the at least one executable operation.

In this case, when there is a need for connection to an external apparatus in order to perform the determined operation, the control unit 250 may generate a control signal for controlling the external apparatus and transmit the generated control signal to the external apparatus.

The control unit 250 may acquire intention information with respect to a user input and may determine a user's requirements based on the acquired intention information.

Meanwhile, the control unit 250 may extract a feature from sensor data acquired in real time, such as image sensor data or LiDAR sensor data. To this end, the artificial intelligence unit 255, i.e., more specifically, the FEM sub-module may be composed of an ANN that is trained according to the machine learning algorithm. Also, the artificial intelligence unit 255 of the robot 1 is trained, but trained by the artificial intelligence unit 355 of the cloud server 300 or through distributed processing therebetween.

The control unit 250 may collect history information including operations of the robot 1, user feedback regarding the operations, and the like and may store the history information in the memory or the artificial intelligence unit 255 or transmit the history information to an external apparatus such as the cloud server 300. The collected history information may be used to update the learning model.

FIG. 11 shows another configuration of the cloud server according to an embodiment of the present invention.

The cloud server 300 that performs a function of an artificial intelligence server, i.e., an AI server may refer to an apparatus that trains an ANN using a machine learning algorithm or an apparatus that uses a trained ANN. Here, the cloud server 300 may be composed of a plurality of servers to perform distributed processing and may be defined as a 5G network.

The cloud server 300 includes the communication unit 380, the server control unit 350, the artificial intelligence unit 355, etc., each of which is the same as described above with reference to FIG. 3. Meanwhile, the cloud server 300 may further include a memory 330.

The memory 330 may include a model storage unit 331. The model storage unit 331 may store a model (or an artificial intelligence network 331a) that is already trained or being trained through the artificial intelligence unit 355.

The artificial intelligence unit 355 may train the artificial intelligence network 331a using learning data. The learning model may be used while installed in the cloud server 300 of the artificial intelligence network or while installed in an external apparatus such as the robot 1.

The learning model may be implemented in hardware, software, or a combination thereof. When some or all of the learning model is implemented in software, one or more instructions constituting the learning model may be stored in the memory 330.

The server control unit 350 may infer a result value for new input data using the learning model and may generate a response or a control command on the basis of the inferred result value.

According to the embodiments of the present invention, the robot can generate a high-quality map by performing cloud SLAM through the cloud server.

Also, according to the embodiments of the present invention, the robot can transmit sensor data to the cloud server and receive information necessary to estimate the location of the robot from the cloud server.

Also, according to the embodiment of the present invention, it is possible to calculate candidate locations of a robot on the basis of information generated by each sensor and estimate final location information of the robot using the candidate locations.

Also, according to the embodiments of the present invention, when the time it takes to process information acquired by any one of a plurality of sensors of the robot is different from the time it takes to process information acquired by another sensor, it is possible to increase location estimation accuracy by reducing or correcting the time difference between the two sensors.

The effects of the present invention are not limited to the aforementioned effects, and those skilled in the art may easily derive various effects of the present invention in the configuration of the present invention.

In the description above, although all of the components of the embodiments of the present invention may have been explained as assembled or operatively connected as a unit, the present invention is not intended to limit itself to such embodiments. Rather, within the objective scope of the present invention, the respective components may be selectively and operatively combined in any numbers. Also, each of the components may be implemented as an independent hardware component. However, some or all of the components may be selectively combined and thus may be implemented as a computer program having program modules that perform some or all functions of one or a plurality of hardware components. Codes or code segments constituting the computer program may be easily deduced by those skilled in the art. By the computer program being stored in a computer-readable storage medium and then read and executed by a computer, it is possible to implement the embodiments of the present invention. The storage medium for the computer program includes storage media including magnetic recording media, optical recording media, and semiconductor recording elements. Also, the computer program for implementing the embodiments of the present invention includes a program module that is transmitted through an external apparatus in real time.

Although the embodiments of the present invention have been described above, various changes or modifications may be made by those skilled in the art. Therefore, it will be understood that the changes and modifications fall within the scope of the present invention without departing from the scope of the present invention.

The present disclosure is intended to solve the above problems and is directed to a robot performing cloud simultaneous localization and mapping (SLAM) through a cloud server to generate a map and estimate the robot's location.

Also, the present disclosure is directed to implementing the SLAM through a cloud server in order to increase location estimation accuracy on the basis of sensor images generated by high-performance sensors.

Also, the present disclosure allows the cloud server to process sensor data in real time, thereby accurately estimating the robot's location in real time.

The objects of the present invention are not limited to the aforementioned objects, and other objects and advantages thereof, which are not mentioned above, will be understandable from the following description and can be more clearly understood by the embodiments of the present invention. Also, it will be readily appreciated that the objects and advantages of the present invention can be realized by means and combinations thereof as set forth in the claims.

According to an aspect of the present invention, there is provided a robot for performing cloud SLAM in real time, the robot including a first sensor configured to acquire sensor data, a storage device configured to store a map, a communication device configured to transmit the sensor data, a feature, or a last frame to the cloud server and receive a local map patch or a global pose from the cloud server, and a controller configured to control communication, via the communication device, of the sensor data, an extracted feature from the sensor data, or the last frame of the sensor data and control movement of the robot based on the local map patch or the global pose received from the cloud server.

According to another aspect of the present invention, there is provided a cloud server for performing cloud SLAM in real time, the cloud server including a storage device configured to store a map, a communication device configured to communicate with a plurality of robots; and a controller configured to generate a map based on sensor data transmitted by plurality of the robots and configured to generate a global pose or a local map patch or each of the plurality of robots.

According to another aspect of the present invention, there is provided a method of performing SLAM in real time, the method including acquiring sensor data from a first sensor of a robot, extracting a feature from the sensor data and performing local mapping to generate a local pose by means of a controller of the robot, transmitting the sensor data and the feature to a cloud server by means of a communication device of the robot, generating a local map patch on the basis of the sensor data and the feature transmitted by the robot by means of a controller of the cloud server, transmitting the local map patch to the robot by means of a communication device of the cloud server, generating loop constraints using the received local map patch and subsequently generating a first global pose by means of the control unit of the robot; and controlling movement of the robot by using the generated first global pose by means of the control unit of the robot.

It will be understood that when an element or layer is referred to as being "on" another element or layer, the element or layer can be directly on another element or layer or intervening elements or layers. In contrast, when an element is referred to as being "directly on" another element or layer, there are no intervening elements or layers present. As used herein, the term "and/or" includes any and all combinations of one or more of the associated listed items.

It will be understood that, although the terms first, second, third, etc., may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section could be termed a second element, component, region, layer or section without departing from the teachings of the present invention.

Spatially relative terms, such as "lower", "upper" and the like, may be used herein for ease of description to describe the relationship of one element or feature to another element(s) or feature(s) as illustrated in the figures. It will be understood that the spatially relative terms are intended to encompass different orientations of the device in use or operation, in addition to the orientation depicted in the figures. For example, if the device in the figures is turned over, elements described as "lower" relative to other elements or features would then be oriented "upper" relative to the other elements or features. Thus, the exemplary term "lower" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Embodiments of the disclosure are described herein with reference to cross-section illustrations that are schematic illustrations of idealized embodiments (and intermediate structures) of the disclosure. As such, variations from the shapes of the illustrations as a result, for example, of manufacturing techniques and/or tolerances, are to be expected. Thus, embodiments of the disclosure should not be construed as limited to the particular shapes of regions illustrated herein but are to include deviations in shapes that result, for example, from manufacturing.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A robot for performing cloud simultaneous localization and mapping (SLAM) in real time, the robot comprising:
    a first sensor configured to acquire sensor data;
    a controller configured to control communication of the sensor data, an extracted feature from the sensor data, or a last frame of the sensor data; and
    a storage configured to store a map,
    wherein,
    the robot is to transmit, to a cloud server, the sensor data, the extracted feature, or the last frame, and the robot is to receive, from the cloud server, a local map patch or a global pose, and
    the controller controls movement of the robot based on the local map patch or the global pose,
    wherein the controller limits a size or a transmission interval of data or limits speed of the robot based on one or more of a location of the robot, a size of the sensor data, location estimation accuracy of the robot, and an operational category of the robot.

2. The robot of claim 1, wherein,
    the controller extracts the feature from the sensor data during a mapping process in order to generate the last frame, wherein the last frame corresponds to a local mapping result, and
    the robot is to transmit the last frame to the cloud server.

3. The robot of claim 2, wherein,
    the controller controls the storage to store the acquired sensor data in chronological order during the mapping process when the robot can not communicate with the cloud server,
    the controller transmits the sensor data to the cloud server when the robot can communicate with the cloud server, and
    the controller performs local mapping and storing the sensor data, without receiving the local map patch or the global pose from the cloud server.

4. The robot of claim 1, wherein,
    the controller extracts the feature from the sensor data during a location estimation process and performs local mapping in order to generate a local pose,
    the robot transmits, to the cloud server, the sensor data and the extracted feature and subsequently receives the local map patch from the cloud server,
    the controller generates loop constraints based on the received local map patch and subsequently generates a first global pose,
    the robot receives, from the cloud server, a second global pose, and
    the controller controls the movement of the robot based on the first global pose and the second global pose.

5. The robot of claim 4, wherein when a communication state with the cloud server is a communication delay state, the controller compares a generation time of the local map patch transmitted by the cloud server during the location estimation process to a generation time of the local pose generated by the controller, and generates a global pose based on the comparing.

6. The robot of claim 1, wherein when the robot is provided in a communication delay state or a communication disconnection state with respect to the cloud server, the controller decreases a moving speed of the robot and controls a size of data transmitted to the cloud server based on an operational category of the robot.

7. The robot of claim 1, wherein
the first sensor is a camera sensor,
the robot includes a second sensor, which is a LiDAR sensor, and
the controller controls the movement of the robot based on image sensor data determined from the camera sensor and LiDAR sensor data determined from the LiDAR sensor.

8. A cloud server for performing cloud simultaneous localization and mapping (SLAM) in real time, the cloud server comprising:
a storage configured to store a map; and
a controller configured to generate a map based on sensor data transmitted by a plurality of robots and configured to generate a global pose or a local map patch for each of the plurality of robots,
wherein the cloud server is configured to communicate with the plurality of robots and receives sensor data transmitted by the plurality of robots, and when the cloud server receives a last frame of the sensor data from each of the plurality of robots, the controller generates a set of nodes based on the last frame.

9. The cloud server of claim 8, wherein,
when a communication state of the cloud server is a communication delay state, the controller sets communication priorities of the plurality of robots according to any one of locations of the robots, a size of the sensor data, location estimation accuracy of the robots, and operational categories of the robots, and
the cloud server transmits the communication priorities to the corresponding robots.

10. The cloud server of claim 8, wherein when the cloud server receives the last frame from the robots, the controller updates the map of the storage using the last frame and loop constraints generated through a loop detector, the controller performs a local map patch to generate the loop constraints, and the cloud server synchronizes the storage with a storage of one of the robots.

11. The cloud server of claim 8, wherein,
the controller generates a local map patch based on a feature and the sensor data transmitted by one of the robots, and
the cloud server transmits the local map patch to the corresponding robot.

12. The cloud server of claim 8, wherein,
the controller selects a candidate node based on a feature and the sensor data transmitted by one of the robots and subsequently generates a global pose, and
the cloud server transmits the global pose to the corresponding robot.

13. A method of performing cloud simultaneous localization and mapping (SLAM) in real time, the method comprising:
acquiring sensor data from a first sensor of a robot;
extracting, by a controller of the robot, a feature from the sensor data and performing local mapping to generate a local pose;
transmitting, by a communication device of the robot, the sensor data and the extracted feature to a cloud server;
generating, by a controller of the cloud server, a local map patch based on the sensor data and the extracted feature transmitted from the robot;
transmitting, by a communication device of the cloud server, the local map patch to the robot;
generating, by the controller of the robot, loop constraints based the received local map patch and subsequently generating a first global pose; and
controlling, by the controller of the robot, movement of the robot based on the generated first global pose.

14. The method of claim 13, further comprising:
selecting a candidate node based on the sensor data and the extracted feature transmitted by the robot and subsequently generating, by the controller of the cloud server, a second global pose; and
transmitting, by the communication device of the cloud server, the second global pose to the robot,
wherein the controlling of the movement of the robot includes controlling, by the controller of the robot, the movement of the robot based on the first global pose and the second global pose.

15. The method of claim 13, further comprising:
setting, by the controller of the cloud server, communication priorities of a plurality of the robots according to any one of locations of the robots, a size of the sensor data, location estimation accuracy of the robots, and operational categories of the robots when a communication state of the communication device of the cloud server is a communication delay state;
transmitting, by the communication device of the cloud server, the communication priorities to the corresponding robots; and
limiting, by the controller of the robot, a size or a transmission interval of data transmitted by the communication device of the robot or limiting speed of the robot according to the received priorities.

16. The method of claim 13, further comprising:
extracting, by the controller of the robot, a feature from the sensor data during a mapping process to generate a last frame, wherein the last frame corresponds to a local mapping result;
transmitting, by the communication device of the robot, the last frame to the cloud server; and
generating, by the controller of the cloud server, a set of nodes using the last frame.

17. The method of claim 16, further comprising storing, by the controller of the robot, the acquired sensor data in chronological order during the mapping process when the communication device of the robot cannot communicate with the cloud server, and transmitting, by the communication device of the robot, the sensor data to the cloud server when the communication device can communicate with the cloud server,
wherein the controller of the robot is to perform local mapping and storing the sensor data, without receiving the local map patch or the global pose from the cloud server.

18. The method of claim 13, wherein,
the first sensor of the robot is a camera sensor,
the robot includes a second sensor, which is a LiDAR sensor, and
the method comprises controlling, by the controller of the robot, the movement of the robot using image sensor data determined based on the camera sensor and LiDAR sensor data determined based on the LiDAR sensor.

* * * * *